United States Patent [19]
Graham

[11] 4,290,251
[45] Sep. 22, 1981

[54] STORM SASHES AND METHOD AND APPARATUS FOR MANUFACTURING

[76] Inventor: Lawrence L. Graham, 300 Great Oak Dr., Athens, Ga. 30605

[21] Appl. No.: 59,904

[22] Filed: Jul. 23, 1979

Related U.S. Application Data

[62] Division of Ser. No. 884,893, Mar. 9, 1978, Pat. No. 4,191,080.

[51] Int. Cl.³ .............................................. E06B 3/26
[52] U.S. Cl. ...................................... 52/656; 49/504; 40/152; 403/401
[58] Field of Search ................... 52/656, 202; 49/501, 49/504; 40/152 R, 158 A, 156; 403/401, 402, 403

[56] References Cited

U.S. PATENT DOCUMENTS

| | | | |
|---|---|---|---|
| 969,163 | 9/1910 | Hunter | 49/501 |
| 2,043,174 | 6/1936 | Jacobson | 49/504 |
| 2,619,574 | 11/1952 | Lambert | 403/401 |
| 3,380,768 | 4/1968 | Wolfensberger | 52/656 |
| 3,425,721 | 2/1969 | Agee | 403/401 |
| 3,429,075 | 2/1969 | Grossman | 49/501 |
| 4,205,486 | 6/1980 | Garnacci | 403/403 |

FOREIGN PATENT DOCUMENTS

| | | | |
|---|---|---|---|
| 2122257 | 12/1971 | Fed. Rep. of Germany | 49/501 |
| 1067149 | 6/1954 | France | 49/501 |

*Primary Examiner*—Price C. Faw, Jr.
*Assistant Examiner*—Henry E. Raduazo
*Attorney, Agent, or Firm*—Newton, Hopkins & Ormsby

[57] ABSTRACT

Transparent storm sash panes are carefully measured and precut for particular window dimensions. The precut rectangular pane is positioned in a gauging slot of a storm sash fabricating apparatus in which an adjustable stop is moved into opposition with a punch unit engaging opposite edges of the pane to thereby establish the proper length of a storm sash frame side to be punched from an extrusion of aluminum or the like. The punch is operated to form an interlocking end on one frame side and simultaneously to form such end on another frame side. Two pairs of frame sides thus produced in the apparatus are placed over the marginal edges of the precut pane, the frame sides being of channel formation, and are secured rigidly at the four corners of the pane by corner end caps or connectors having recesses to interlock with punched tabs on the opposite ends of the frame members. Accuracy of size, durability and economy of manufacturing for the storm sashes are assured.

4 Claims, 11 Drawing Figures

U.S. Patent  Sep. 22, 1981  Sheet 1 of 2  4,290,251
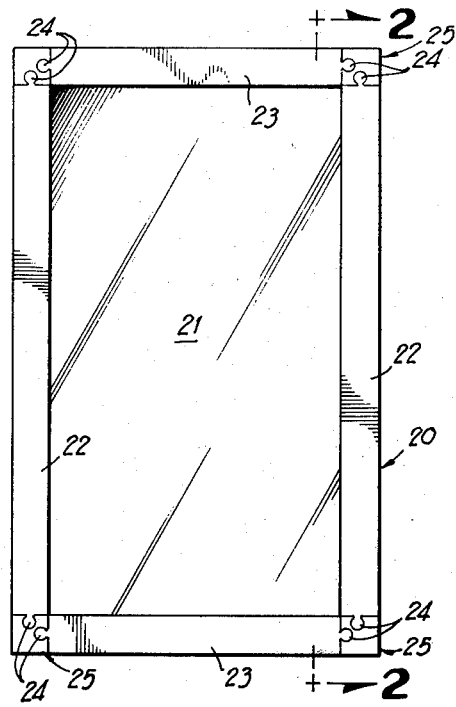
FIG 1
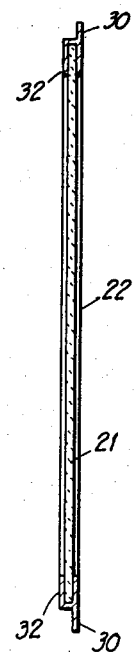
FIG 2
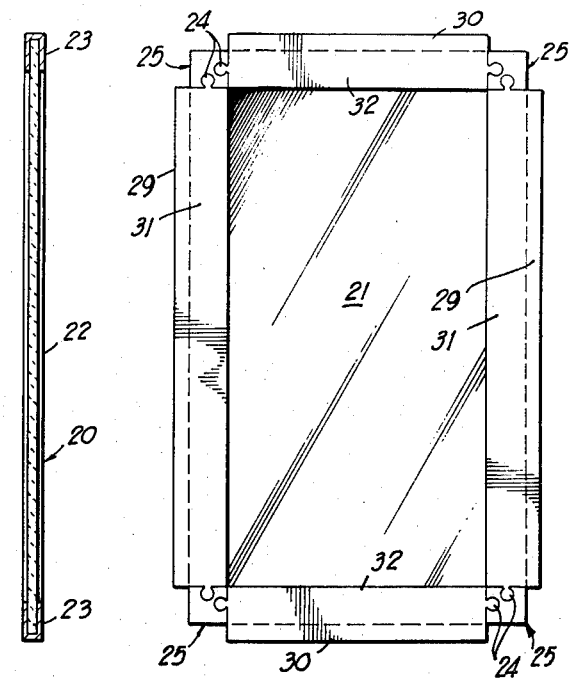
FIG 3
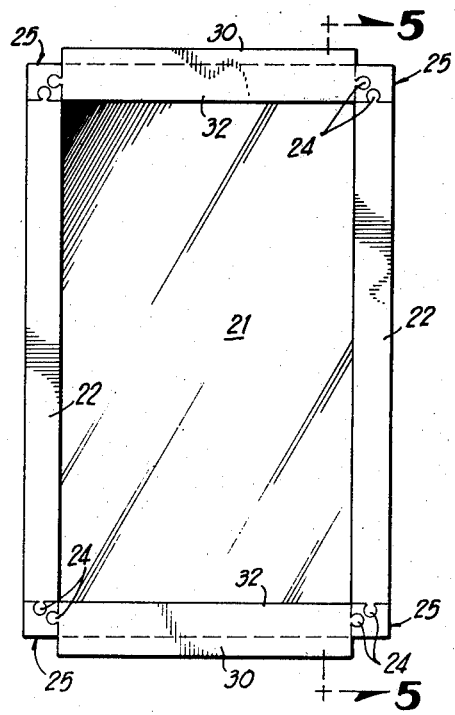
FIG 4
FIG 5
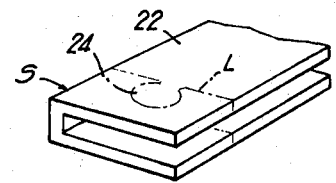
FIG 6
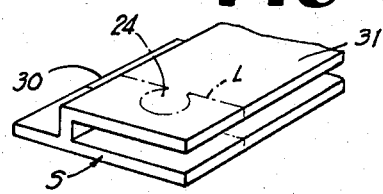
FIG 7
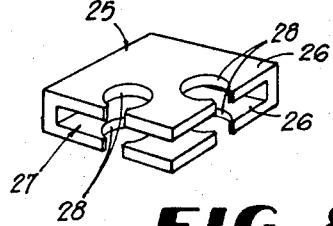
FIG 8

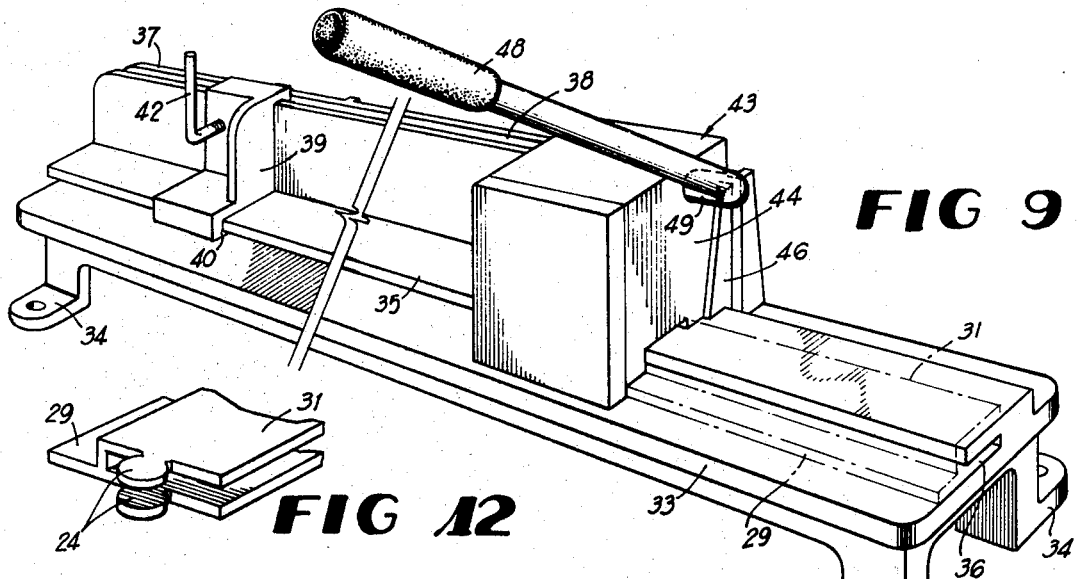
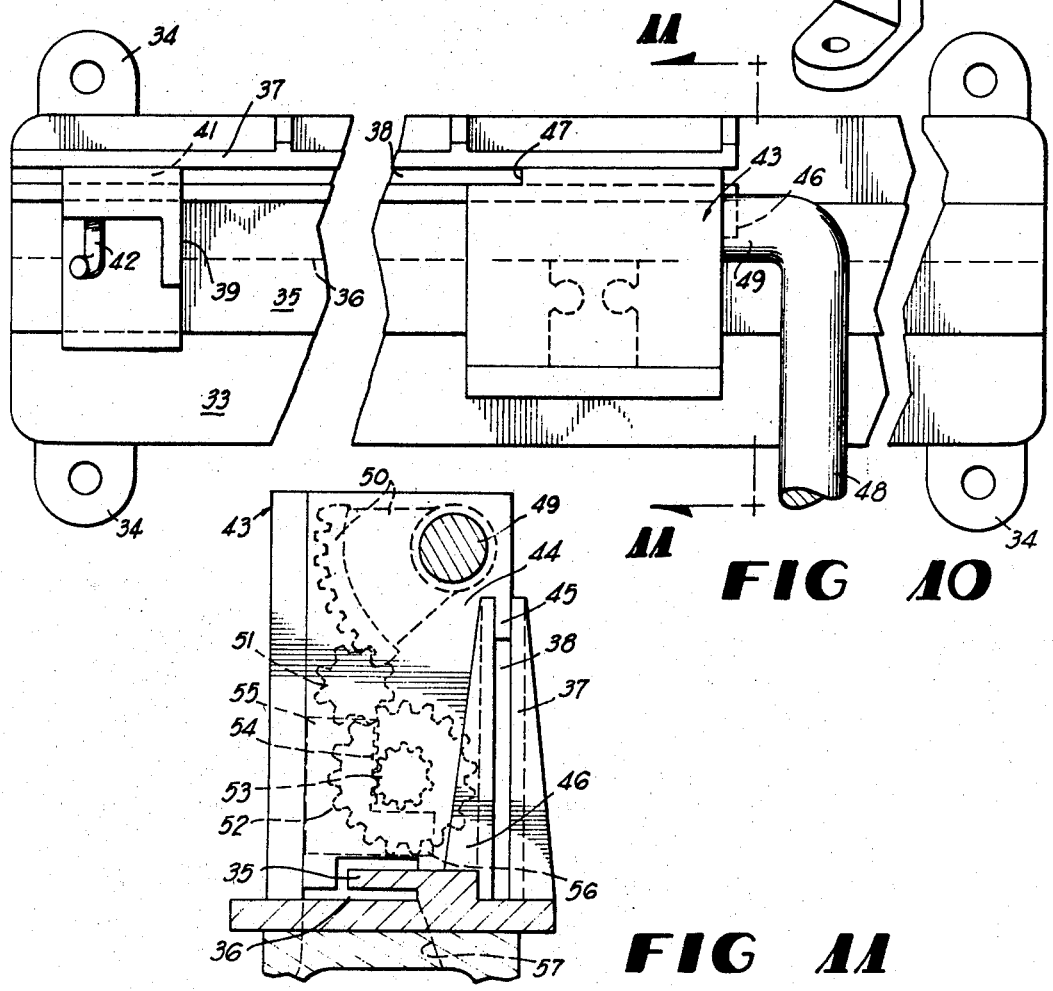

STORM SASHES AND METHOD AND APPARATUS FOR MANUFACTURING

This is a division of application Ser. No. 884,893, filed Mar. 9, 1978 and now U.S. Pat. No. 4,191,080.

BACKGROUND OF THE INVENTION

Various types of storm sashes are known in the prior art including wooden and metal framed sashes for double hung sliding sash windows and for certain types of casement windows and other windows that open outwardly. Such prior art storm sashes vary considerably in quality and cost and the home owner faces considerable frustration in attempting to locate and select the best type of storm sash for his particular window arrangement at a cost which is feasible. The problem is usually compounded with casement windows and other windows which open outwardly and a number of rather unsatisfactory and costly clip-on storm sashes for such windows have been offered in the past but have not been widely accepted by the public. One main problem is that the dimensions and types of casement windows vary considerably and there are few standards. Some casement windows are wooden and some are metal and these differences complicate the problem of providing satisfactory storm sashes.

Some examples of the known patented prior art are the following patents which are made of record herein to comply with the duty to disclose under 37 C.F.R. 1.56: U.S. Pat. Nos. 2,173,758; 2,867,302; 2,576,348; 2,923,351; 2,621,764; 3,058,518; 2,667,245; 3,352,060; 3,606,419.

According to one aspect of this invention, a substantial improvement on the prior art is achieved through the provision of a simplified, economical and sturdy storm sash particularly for casement windows which can be accurately dimensioned and tailored to meet the needs of any particular installation on the job site. The storm sash according to the invention includes a sash pane of clear plastic or glass which is measured and precut to fit a particular window installation. An extruded metal channel frame surrounds the margin of the precut sash completely and includes frame sides or sections which are punched out of extrusion stock on the job site or according to strict specifications away from the job site to provide a tailored accurately fitting installation. The punched sash frame sections have integral locking tabs at opposite ends thereof to mate with locking recesses formed in corner caps or connectors for the frame sections of the storm sash.

According to another aspect of the invention, a simplified apparatus and method is provided for fabricating storm sashes of varying sizes with uniformity, accuracy and convenience, either on a job site or according to obtained measurements away from the job site. The apparatus facilitates the cutting of frame sections to accurate length by a simple punching operation, while simultaneously producing integral locking tabs on the ends of each frame section. The accurately precut sash pane is employed in the apparatus and method as a gaging element, to assure the accurate formation of the frame sash sections in proper lengths with precision and uniformity.

In connection with the apparatus and method aspects of the invention, the following additional prior art United States patents are made of record. U.S. Pat. Nos. 128,758; 1,910,838; 918,842; 1,990,092; 1,783,445; 2,812,816; 3,108,558.

Other features and advantages of the invention will become apparent during the course of the following description.

BRIEF DESCRIPTION OF THE DRAWINGS

FIG. 1 is a plan view of a storm sash constructed according to the invention in accordance with one preferred embodiment.

FIG. 2 is a vertical section taken on line 2—2 of FIG. 1.

FIG. 3 is a plan view of a modified form of storm sash embodying the invention.

FIG. 4 is a similar plan view of a further modified form of sash.

FIG. 5 is a vertical section taken on line 5—5 of FIG. 4.

FIG. 6 is an enlarged fragmentary perspective view of a channel frame section of the type employed in FIG. 1 and showing the phantom lines the profile of a punched end thereof.

FIG. 7 is a similar perspective view of a frame section of the type employed in FIG. 3.

FIG. 8 is a perspective view of a corner cap or connector employed in the sash with either type of sash frame section.

FIG. 9 is a fragmentary perspective view of an apparatus employed to make the sashes shown in FIGS. 1 to 8.

FIG. 10 is a fragmentary plan view of the apparatus.

FIG. 11 is a transverse vertical section taken on line 11—11 of FIG. 10.

FIG. 12 is a fragmentary perspective view of one end portion of a channel frame section showing the locking tabs thereof.

DETAILED DESCRIPTION

Referring to the drawings in detail wherein like numerals designate like parts, and referring first to FIGS. 1 through 8, there is shown in FIGS. 1 and 2 a storm sash 20 comprising a rectangular pane 21 formed of a suitable clear plastic or glass. In accordance with the method embodied in this invention, the rectangular pane 21 is accurately measured and precut to size using conventional means, and using an actual casement window or window specifications as the basis for measuring and cutting so that the ultimate storm sash 20 will be a tailor-made fit.

Pairs of long and short frame sections 22 and 23 formed of extruded aluminum channel stock or the like make up the frame for the sash 20 and these frame sections are precisely cut to length and are stamped to form preferably circularly curved integral locking tabs 24 on the opposite ends thereof by use of the apparatus shown in FIGS. 9 through 11, which will be fully described. The sash 20 further comprises corner square caps or connectors 25 shown in detail in FIG. 8, and which caps have side walls 26 in spaced parallel relationship forming corner slots 27 for the reception of the square corners of the pane 21. The side walls 26 have aligned pairs of circular locking recesses 28 for the reception of the locking end tabs 24. The connectors 25 have enough resiliency in their side walls 26 to allow snapping over the end tabs 24 in the final assembling of the sash frame. The several channel cross section frame sections 22 and 23 receive marginal edge portions of the pane 21 snugly as shown in FIG. 2.

In FIG. 3, there is shown a slight variation of the storm sash construction which differs from the construction in FIGS. 1 and 2 only by the provision of outer longitudinal edge flange extensions 29 and 30 extending along the long and short extruded channel frame sections 31 and 32 and lying in the same plane with one face of the frame structure. The identical end locking tabs 24 are formed on the frame sections 31 and 32 and the same corner connectors 25, previously described, are employed to lock the four frame sections in rigid assembled relationship. The purpose of the flange extensions 29 and 30 is to facilitate installing the storm sash on certain types of windows with certain well known types of mounting hardware or clamps which, per se, form no part of the invention and need not be described. The plain channel frame of FIG. 1, for example, can fit bodily in a window frame recess or within a screen recess, or can be mounted on the exterior face of a window frame and secured by clamping brackets held by screws. In FIG. 3, where the flanges 29 and 30 are provided, the clamping means can simply lap the flange extensions and secure the sash in place.

FIGS. 4 and 5 show another variation of the invention which can be called a compromise between the structures in FIGS. 1 and 3. That is to say, in FIG. 4, the sash may comprise the pane 21, one pair of the frame sections 22 and one pair of the sections 32 equipped with the flange extensions 30. In some cases, the flange extensions may be utilized on the longer frame sections 22 and not on the shorter frame sections. In all cases, the same locking tabs 24 and coacting corner connectors or caps 25 are employed, and the variations are simply to facilitate attaching or mounting the sashes on various type of casement windows, leaded windows and the like. In all cases, the storm sash has precise dimensions, square corners and is rigid and secure. It is also thin and compact as best shown in FIGS. 2 and 5 and therefore lightweight and easy to handle.

An important aspect of the invention is the unique and convenient apparatus and method for use in fabricating the storm sashes described in connection with FIGS. 1 to 8. The apparatus is very simple and requires no degree of skill to operate and assures consistently good results in the manufacturing of the sashes.

The apparatus comprises an elongated base 33 having attaching feet 34 and the base includes a slightly elevated plate or flange 35 forming between it and the base a comparatively narrow continuous longitudinal groove 36 which is forwardly open with reference to the forward side of the apparatus shown in FIG. 9. The apparatus further comprises an upstanding vertical back rest 37 rising from the base 33 and rigid therewith and this backrest has an open top continuous longitudinal slot 38 formed therein at right angles to the slot or passsage 36.

An adjustable stop 39 has right angular tongues 40 and 41 which engage slidably within the horizontal and vertical slots 36 and 38 to be guided thereby longitudinally of the base 33. The adjustable stop 39 can be locked anywhere along the base 33 by a clamping set screw 42. The vertical stop wall or surface 39 is disposed at right angles to the back rest 38 and base 33.

A coacting punch unit 43 is similarly guidingly engaged with the base 33 and has a block-like body 44 equipped at its rear side with a depending tongue 45 guidingly engaged in the vertical slot 38. The bottom of the unit 43 is permanently attached to the base 33 and is shaped to overlie the elevated flange 35 as shown in FIG. 11. A vertical web 46 at one end of the back rest 37 serves as a location stop for the punch unit 43.

A unique feature of the apparatus and method is that the carefully precut sash pane 21 forms a gauging element in the fabricating apparatus in the following manner. The pane 21 is placed upright in the top opening slot 38 first along its narrow or longer dimension, as is desired, and then along its other dimension. In either case, the lower edge of the pane 21 will bottom on the base 33. With one vertical edge of the pane 21 against the punch recess 47 the stop 39 is slid into engagement with the other vertical edge of the pane 21 within the slot 38.

An extruded aluminum channel member to form a frame section 22 or 23 or 31 or 32 is placed endwise into the horizontal slot 36 and over the projecting flange 35 as shown in phantom lines in FIG. 9. The extrusion bar is moved endwise until its far end abuts the fixed stop 39 while passing under the unit 43 and while being snugly engaged with the flange 35. This will accurately position the extrusion to be cut off in the apparatus to the precise length to form one of the long or short frame sections 22 or 23 or 31 or 32, while simultaneously forming the integral locking tabs 24 on the trailing end of one frame section and on the leading end of the next frame section.

The punch mechanism per se for accomplishing the cutting off and punching operations comprises a hand lever 48 having a rotary shaft extension 49 journaled in the body portion 44 and having gear sector means 50 secured thereto, FIG. 11. The gear sector means meshes with and drives a smaller transfer idler gear means 51 in the unit 43, in turn meshing with a larger pinion drive gear means 52, in turn driving a smaller diameter pinion gear 53 rigidly or integrally attached thereto. The pinion gear 53 meshes with and drives a vertically shiftable rack gear 54 formed as an integral part of a vertically shiftable die carrier 55 having a die block 56 formed as a part thereof or carried thereby, FIG. 11. The die block 56 is profiled to engage the extrusion being held on the base 33 in the described manner and to cut off the same cleanly to length at the line L, FIGS. 6 and 7, while simultaneously forming on the top and bottom walls of the channel extrusion the two aligned heads 24 which are adapted to enter the locking recesses 28 of corner connectors 25. The resulting scrap S, FIGS. 6 and 7, formed by this cutting and punching operation falls through an outlet opening 57 formed through the base 53, FIG. 11. The necessary vertical movement of the die 56 to generate the cutting and punching operation is produced by pulling down the lever 48 which rotates the shaft extension 49 and turns the gearing in the direction of the arrows in FIG. 11 to drive the die block downwardly against the extrusion. The die block may be spring biased upwardly by conventional spring means, not shown.

To summarize the method of constructing a storm sash according to the invention, the rectangular pane 21 is carefully measured and cut to size. Such pane is then placed upright in the vertical slot 38 and against the punch recess 47 and the stop 39 is slid toward the fixed stop until one vertical edge of the pane engages the face of stop 39. With the extrusion channel engaged over the flange 35 and resting on the base 33 with one end thereof against the stop 39, the punch is operated by use of the handle 48 to cut off the extrusion to the exact length for making one of the frame sections while simultaneously producing the locking tabs 24. While so processing one end of one frame section, the punch also processes one end of the next oncoming frame section. The operation is repeated to produce either the two short or the two long frame sections of the sash and then the pane 21 is rotated ninety degrees and its other dimension is placed in the slot 38 with proper adjustment of the stop 39 and the punch is again utilized to produce the other two frame sections.

During such operations, the storm pane 21 itself gages the apparatus and assures perfect accuracy in the formation of the extruded frame sections and their locking tabs.

It is then only necessary to engage the four channel-shaped frame sections over the edges of the pane 21 and apply the corner connectors 25 and the storm sash is completed and ready for mounting on a casement window or the like by means of suitable hardware.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A storm sash or frame member comprising a rectangular pane formed of translucent material, pairs of opposite side channel cross section frame sections embracing opposite side longitudinal edge portions of said pane, said opposite side frame sections having lengths whereby square corner portions of the pane project beyond the ends of adjacent frame sections and remain exposed, integral locking tabs carried by the opposite ends of portions of said frame sections and lying generally in the same planes adjacent to opposite sides of portions of the square corner portions of the rectangular pane, and separately formed corner connectors for the ends of the frame sections having side walls engaging over the square corner portions of said pane and having side wall locking apertures adapted to receive and interlock with said locking tabs, said portion of said corner connectors having right angular edges abutting the end faces of adjacent parts of said portions of said frame sections when assembled with the frame sections to produce a continuous rigid channel frame entirely around the margin of said pane.

2. A storm sash do as defined in claim 1, and longitudinal mounting flange extensions carried by at least one opposing pair of said frame sections in a plane with the front portions of said opposed pair of said frame sections along the outer longitudinal edges thereof, said flange extensions terminating at said corner connectors so as to be non-contiguous therewith.

3. A storm sash or frame member as defined in claim 1, and said corner connectors being substantially square and having a pair of right angular edge walls interconnecting the side walls of the corner connectors along two sides thereof only.

4. A storm sash do as defined in claim 1, and said locking tabs integral with said frame sections locking apertures being of circular formation and interfitting snugly in the assembled storm sash.

* * * * *